Patented Oct. 10, 1933

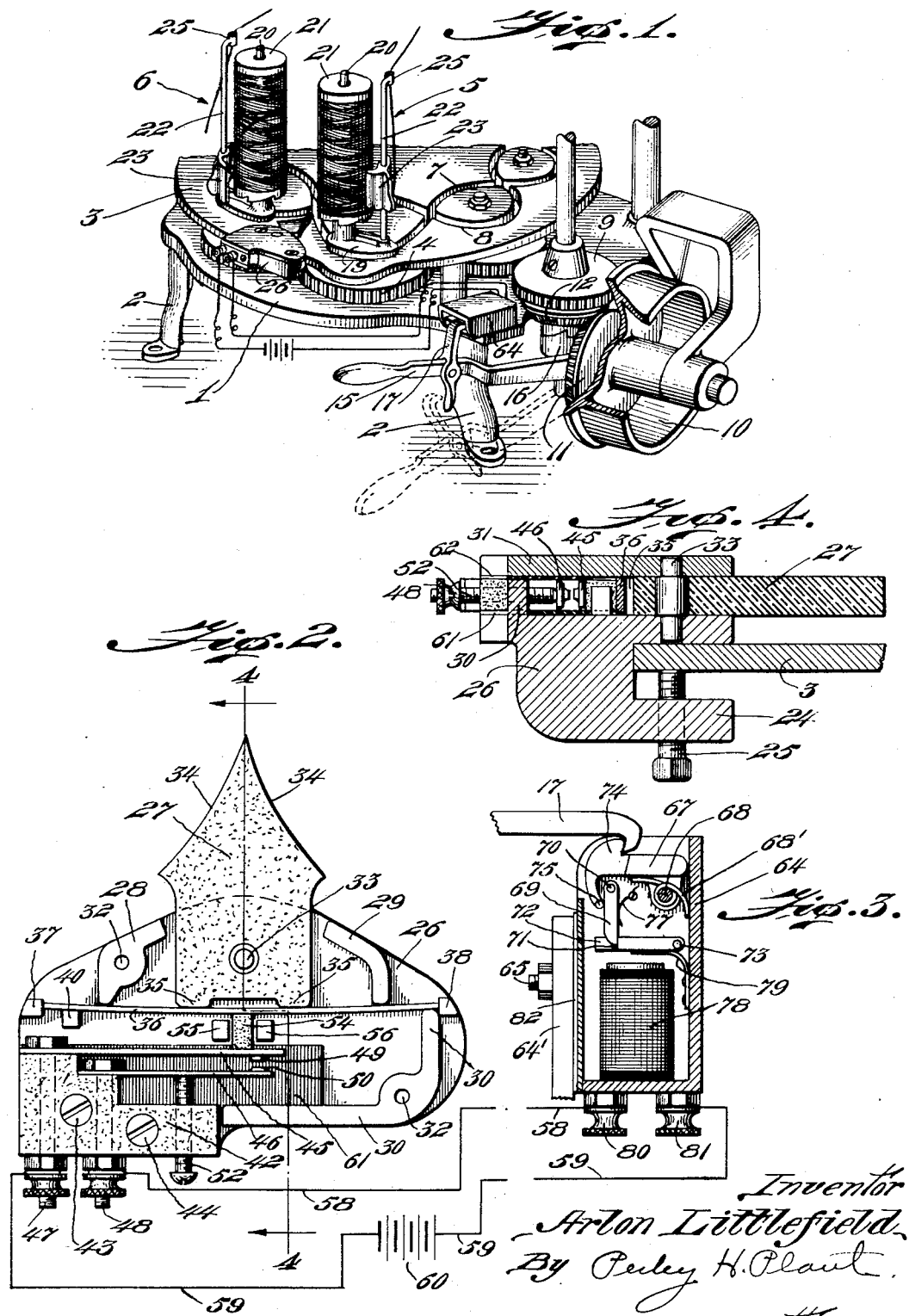

1,930,245

UNITED STATES PATENT OFFICE 1,930,245

STOP MOTION MECHANISM

Arlon Littlefield, Cranston, R. I., assignor to New England Butt Company, Providence, R. I., a corporation of Rhode Island Application July 30, 1931. Serial No. 554,026

3 Claims. (Cl. 96—19)

This invention relates to an improved stop motion mechanism adapted for use in connection with braiding machines and the like, whereby the operating mechanism of the machine is disengaged from the driving mechanism upon the breakage of one of the threads or strands forming the braid.

In stop motion devices of this character as heretofore generally employed the release member or members as applied to or positioned upon the top plate of the braiding machine have been relatively heavy and difficult to move, both by reason of their own weight and also because of the fact that they have been connected to the shift lever by mechanical means. The inertia of such stop motion mechanisms is so great as to be liable to break or injure portions of a bobbin carrier upon striking one of the release members when moving at high speed. Moreover, with devices of this character which are entirely mechanical in their operation a very considerable movement of the release member must be effected in order to cause the release of the shift lever, and the thread carrier must therefore be subjected to a severe strain which is continued until the shift lever is released.

The present invention has for its principal object to overcome the difficulties and provide a positive and at the same time delicately actuated stop motion which will not cause breakage of or injury to the thread carriers but in which the release member or wiper arm may be actuated by a minimum of movement and without the exertion of any great amount of force, as well as a device in which the shift lever will be released upon actuation of the release member or wiper arm without the expenditure of force directly thereon, to move the lever from its engaged to its released position.

Another object of the invention is to provide a device of this character which is of simple construction and which may be readily applied to or removed from a braiding machine or the like without interference with or material change in the braiding machine mechanism.

Another object of the invention is to provide a device of this character which may be applied to a braiding machine as a single stop motion device, or in multiple, so as to provide means for stopping the mechanism at a point in the travel of a thread carrier closely adjacent to the point where a strand becomes broken regardless of the position of the thread carrier when the breakage occurs.

A further object of the invention is the provision of an electrically controlled stop motion device which is so constructed and arranged that the electrically operated elements are entirely insulated from the machine frame and from the operating machine parts whereby the danger from fire hazard is entirely eliminated.

Other objects and advantages of the invention relate to various improved details of construction and novel arrangements of the parts as will be more fully set forth in the detailed description to follow.

Referring to the drawing:—

Fig. 1 is a perspective view of a portion of a braiding machine of a conventional type showing one of the stop motion devices applied thereto and illustrating its relation to a latch mechanism and shift lever designed to disconnect the drive pulley from the operating mechanism of the braiding machine.

Fig. 2 is a top plan view of the stop motion device with the cover removed, showing the wiper arm and associated mechanism for actuating the latch to release the shift lever.

Fig. 3 is a sectional view of the latch box with one side removed to show the latch and latch operating mechanism in position to be released upon movement of the wiper arm, the electric circuit from the stop motion device, as illustrated in Fig. 2, being shown in its relation to that part of the circuit which is associated with the latch mechanism, and, Fig. 4 is a vertical sectional view of the stop motion device, taken substantially along the line 4—4 of Fig. 2.

In the embodiment of the invention illustrated herewith, 1 designates the bottom plate of a braiding machine which is supported by legs 2, and which in turn supports the braiding machine mechanism. A top plate 3 is spaced from the bottom plate 1 a sufficient distance to receive therebetween the several horn gears 4 which serve to move the thread carriers 5 and 6 in opposite directions along the tortuous carrier runs 7 and 8 respectively. The gear portion of each horn gear 4 meshes with the gear portions of those horn gears located upon opposite sides thereof, and the several gears are driven from a drive gear 9, which is in turn driven from the drive pulley 10 through beveled gears 11 and 12 as is well known in the art.

A shift lever 15 serves to connect the drive gear 9 with the driven gear 12 through a suitable sliding clutch 16 when the shift lever 15 is in its full line position as shown in Fig. 1, and holds the clutch 16 out of driving engagement with the drive gear 9 when the lever is in its dotted line position as shown in Fig. 1. The shift lever 15 is provided with a hook 17 for engaging a releasable latch member to hold the shift lever 15 in its full line position as shown in Fig. 1 until released.

The thread carriers 5 and 6 each comprise a base portion 19 provided with a spindle 20 for supporting a bobbin 21, and a vertical weight guiding arm 22 for guiding the weight 23. The weight guiding arm is also provided with a thread guide 25 for guiding the thread as it passes from the bobbin 20 beneath the weight 23 to the thread former (not shown). The above described thread carriers are of a conventional type well known in the art and are so mounted upon the top plate as to be adapted for use in making round, flat or special forms of braid.

The stop motion mechanism comprises a casing 26 having a substantially flat surface adapted to support the release member or wiper arm 27 and its associated parts, and peripheral upstanding lugs 28, 29 and 30 which may be formed integral with the casing and which serve to space the cover 31 from the main portion of the casing in such a manner as to provide a recess for the operating mechanism and partially enclose the mechanism receiving recess located between the flat surface of the casing 26 and the inner face of the cover. The lugs 28 and 30 are provided with threaded openings 32 to receive screws or other suitable fastening means for securing the cover 31 to the casing 26. The wiper arm 27 is mounted for pivotal movement upon a pivot pin 33 carried by the casing and has a portion projecting outwardly from the casing which is provided with curved sides 34 for a purpose which will be more fully described hereinafter. The inner end or base portion of the wiper arm terminates in side end portions 35 which are substantially equidistant from the pivot point 33.

The casing 26 is provided with a portion 24 offset from that portion of the casing which supports the wiper arm 27 to form therewith a horizontal recess for the reception of the edge of the top plate 3, and the offset portion 24 is provided with a set screw 25 for clamping the casing 26 to the top plate of a braiding machine.

A resilient member 36 is carried by the casing 26 and is held against longitudinal movement by two upstanding lugs 37 and 38 carried by or formed integral with the casing 26. The resilient member 36 is supported upon one side and at points adjacent to the ends thereof by a lug 40 and a portion of the peripheral lug 30 respectively, and the peripheral lugs 28 and 29 have inturned portions extending a sufficient distance to engage the opposite sides of the resilient member inwardly of the points of its engagement by the lugs 40 and 30. The provision of these supporting means for opposite sides of the resilient member 36 serves to hold the resilient member firmly in place in the casing and prevent any undue vibration of the resilient member when the machine is in operation such as might cause chattering of the resilient member and possibly vibrate the connecting block sufficiently to cause accidental engagement of the electrical contact, although any other suitable or desired arrangement of supporting means may be substituted for that shown. The end portions 35 of the wiper arm both contact with the side of the resilient member 36 adjacent to the central portion thereof and upon that side opposite to the supporting lugs 40 and 30 when the parts are in their normal position and when no force is being exerted upon one of the curved faces 34 of the wiper arm to cause it to move about its pivot 33.

A contact supporting block 42 of insulating material is secured to the casing 26 by means of screws or other suitable fastening means 43 and 44, and supports spring arms 45 and 46 held therein by bolts or the like 47 and 48 respectively. The spring arms 45 and 46 are provided with cooperating electrical contacts 49 and 50 respectively, and these arms are located in substantial parallelism with each other and with the resilient member 36. An adjusting screw 52 is carried by the supporting block 42 and engages the spring arm 46 for adjustably supporting the contact 50 in the desired position for engagement by the contact 49 upon suitable movement of the spring arm 45.

A connecting member 54 of insulating material is slidably mounted between two guide lugs 55 and 56 carried by the casing 26 and is normally in engagement or in substantial engagement with the central portion of the resilient member 36 and the spring arm 45. The bolts 47 and 48 are formed of metal possessing a suitable degree of electrical conductivity to form portions of the electric circuit which includes the spring arms 45 and 46, and wires 58 and 59 are connected to the bolts 47 and 48 for completing the circuit through a battery 60 and the latch operating mechanism. The wiper arm 27 and conecting member 54 are preferably formed from a suitable insulating material, and layers 61 and 62 of insulating material are preferably interposed upon opposite sides of the contact suporting block 42 to insure the complete insulation of the block and the elements carried thereby from the casing 26 and the cover 31 when the parts are assembled.

A latch box 64 of any suitable design may be secured to a portion 64' of the machine frame as by means of one or more bolts 65, to provide a suitable electrically operated latch mechanism for releasing the shift lever 15 from its full line position, as seen in Fig. 1, upon movement of the wiper arm 27 through actuation by one of the weights 23 upon the breakage of a thread. The latch box 64 contains a suitable latch member 67 which is supported by a pivot shaft 68 and is normally held in the position shown in Fig. 3 of the drawing by a pawl 69 which is pivoted to the side of the latch box by a pin 70 and engages a shoulder 71 of an armature plate 72 which is in turn pivotally supported by a shaft 73. A coiled spring 68' surrounds a portion of the shaft 68 and engages the latch member 67 to normally force the latch member upwardly into the position shown in Fig. 3 of the drawing. The main body portion of the latch member 67 is cut away at the side as indicated at 74 to permit it to move past the pawl 69 and its pivot pin 70 as it pivots upon the shaft 68, but the latch member 67 has a laterally projecting lug 75 which extends outwardly from the latch member to engage the pawl 69, whereby the latch member is held in the position shown in Fig. 3 of the drawing when the armature plate 72 is in the raised position shown in that figure.

A light spring 77 engages the pawl 69 to move it outwardly into armature engaging position when the armature plate is drawn downwardly by the electric coil 78, and a spring 79 engages the armature plate to raise the same into the position shown in Fig. 3 when the current through the coil 78 is cut off. The wires 58 and 59 from the contact supporting block 42 are connected to terminals 80 and 81 carried by the latch box 64, the terminals 80 and 81 serving as terminals of the coil 78. A sheet of insulating material 82 is preferably interposed between the latch box 64 and the portion 64' of the machine frame to which it is secured in order to insulate completely the latch box from the machine frame.

In the operation of my stop motion device as applied to a braiding machine of the type shown herein a single stop motion unit may be secured to the top plate 3 of the machine in such a position that the wiper arm 27 is located intermediate the paths of movement of the thread carriers 5 and 6 so that one of the curved surfaces 34 will be engaged upon one side or the other by one of the weights 23 whenever such weight drops to the base of its guide arm 22 through the breakage of the thread carried by the corresponding bobbin 21. If desired, two or more stop motion units may be secured to the top plate 3 and arranged thereon in such a manner as to be substantially uniformly spaced from each other about the top plate so that one of these stop motion devices will become effective to release the shift lever substantially immediately upon the breakage of a thread regardless of the point where such breakage occurs in the path of travel of the thread carrier.

When the thread carried by one of the bobbins becomes broken the weight 23 falls to the bottom of its guide arm 22, where it is in position to press against one of the curved faces 34 of the release member or wiper arm 27 as the bobbin carrier passes the stop motion device. The pressure thus exerted upon the wiper arm 27 causes the arm to move about its pivot 33 whereby one side end portion 35 of the wiper arm presses against the resilient member 36 to bend the central portion thereof towards the connecting member 54 and move the connecting member between its guide lugs 55 and 56 sufficiently to cause it to press against the spring arm 45 and force the contact 49 into engagement with the contact 50 carried by the spring arm 46, thereby closing the circuit through the wires 58 and 59 and coil or coils 78 whereby the coil or coils are energized to attract the pivoted armature plate 72 downwardly from the position shown in Fig. 3 of the drawing and into engagement with the coil or coils 78. As the armature plate 72 is drawn downwardly about its pivot, the shouldered portion 71 of the armature plate moves out of the path of the pawl 69, whereupon the weight of the shift lever 15 draws the latch member 67 downwardly about its shaft 73 and out of the path of movement of the hook 17 thus permitting the hook to slide thereover and release the shift lever 15. As the latch member moves downwardly, the lug 75 carried thereby forces the pawl 67 towards the right, as seen in Fig. 3, against the tension of the spring 77 to permit the latch member to move downwardly a sufficient distance to release the hook 17. Immediately upon the release of the hook 17 the shaft lever drops by gravity into the dotted line position shown in Fig. 1, and when the weight of the shift lever is taken from the latch member 67, the coiled spring 68' returns the latch member to the position shown in Fig. 3, and the light spring 77 returns the pawl 69' immediately to the position shown in Fig. 3 before the release of the armature plate 72 by the coils 78. When the weight 23 passes out of engagement with the curved face 34 of the wiper arm, the wiper arm is returned to its original position by the force exerted thereon by the resilient member 36 and the spring arm 45 resumes its original position forcing the connecting member 54 back into the position shown in Fig. 2 and moving the contact 49 out of engagement with the contact 50. The separation of the contacts 49 and 50 breaks the circuit through the coils 78 and releases the armature plate 72 which is returned to the position shown in Fig. 3 of the drawing by the spring 79.

The machine may be restarted by first mending the broken thread, raising the weight 23, and then raising the shift lever 15 to connect the drive gear 9 with the driver pulley. After the release of the armature plate 72 by breaking the circuit through the coil 78 the parts of the latch mechanism assume their positions substantially as shown in Fig. 3, and upon the hook 17 being engaged over the latch member the parts are again in position for the operation of the mechanism.

What I claim is:—

1. A stop motion mechanism comprising a casing provided with means whereby it may be removably secured to the top plate of a braiding machine, a wiper arm pivotally mounted in said casing for movement in a direction substantially parallel with the top plate and having a portion projecting outwardly from the casing and provided with curved sides, a resilient member carried by said casing and having its end portions supported by said casing in such a manner that the central portion thereof is engageable by a portion of the wiper arm upon movement of the wiper arm about its pivot to move the central portion of said resilient member out of its normal position, means located adjacent to said resilient member and actuatable upon movement of the central portion of said member for closing an electric circuit, and means operable upon the closing of the electric circuit for releasing a lever controlling latch to disconnect the drive mechanism of the braiding machine.

2. In a positively actuated stop motion mechanism for braiding machines, a casing provided with means for attachment to the top plate of a braiding machine, a wiper arm pivotally supported within the casing and having a portion extending beyond the casing and within the path of movement of a portion of a thread carrier, resilient means engaging a portion of said wiper arm for normally holding said arm in fixed position relative to said casing and returning the arm to its fixed position after engagement by a portion of a thread carrier, contact supporting means carried by said casing, means carried by said contact supporting means for closing an electric circuit, means operable upon movement of said wiper arm about its pivot point for actuating said circuit closing means to close an electric circuit, and means operable upon closing the electric circuit for releasing a lever control latch to disconnect the drive mechanism of the braiding machine.

3. In a stop motion mechanism for braiding machines, a latch actuating member provided with means for attachment to the top plate of a braiding machine and comprising a pivotally mounted wiper arm having a portion normally extending into position to be engaged by a portion of a thread carrier upon the breakage of a thread, means supported by said latch actuating member and actuable upon movement of said wiper arm about its pivot point in either direction from its normal position for closing an electric circuit, and means operable upon the closing of the electric circuit for releasing a lever controlling latch to disconnect the driving mechanism of the braiding machine.

ARLON LITTLEFIELD.